(12) United States Patent
Alexander et al.

(10) Patent No.: US 10,697,588 B2
(45) Date of Patent: Jun. 30, 2020

(54) INFLATABLE STRUCTURAL MEMBER

(71) Applicant: GM Global Technology Operations LLC, Detroit, MI (US)

(72) Inventors: Paul W. Alexander, Ypsilanti, MI (US); Nilesh D. Mankame, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 192 days.

(21) Appl. No.: 15/854,240

(22) Filed: Dec. 26, 2017

(65) Prior Publication Data
US 2019/0195427 A1 Jun. 27, 2019

(51) Int. Cl.
| | |
|---|---|
| *F16L 11/00* | (2006.01) |
| *F16S 3/00* | (2006.01) |
| *B32B 5/02* | (2006.01) |
| *B32B 5/26* | (2006.01) |
| *B32B 5/14* | (2006.01) |
| *D03D 3/02* | (2006.01) |
| *D03D 7/00* | (2006.01) |
| *D03D 11/02* | (2006.01) |
| *B32B 25/10* | (2006.01) |
| *D04B 1/22* | (2006.01) |
| *D03D 1/02* | (2006.01) |
| *D03D 11/00* | (2006.01) |
| *F16L 11/10* | (2006.01) |

(52) U.S. Cl.
CPC .............. *F16S 3/00* (2013.01); *B32B 5/024* (2013.01); *B32B 5/026* (2013.01); *B32B 5/14* (2013.01); *B32B 5/26* (2013.01); *B32B 25/10* (2013.01); *D03D 1/02* (2013.01); *D03D 3/02* (2013.01); *D03D 7/00* (2013.01); *D03D 11/00* (2013.01); *D03D 11/02* (2013.01); *D04B 1/225* (2013.01); *B32B 2597/00* (2013.01); *D10B 2403/021* (2013.01); *D10B 2403/0241* (2013.01); *F16L 11/10* (2013.01)

(58) Field of Classification Search
CPC ..................................... B23Q 5/26; B25J 9/14
USPC ... 248/631, 654, 346.2, 188.1, 188.5, 188.8, 248/188.9
See application file for complete search history.

(56) References Cited

U.S. PATENT DOCUMENTS

| | | | | |
|---|---|---|---|---|
| 4,993,522 A * | 2/1991 | Wagner | ................. | F16F 9/0272 188/269 |
| 5,915,674 A * | 6/1999 | Wolf | ..................... | F16F 9/0245 267/64.12 |
| 6,736,380 B2 * | 5/2004 | Knapp | .................. | F16F 9/0272 267/131 |
| 2006/0191691 A1 * | 8/2006 | Lohbeck | ............... | E21B 43/105 166/382 |
| 2019/0209934 A1 * | 7/2019 | Rosenbaum | ........... | A63H 3/001 |

* cited by examiner

Primary Examiner — Steven M Marsh
(74) Attorney, Agent, or Firm — Quinn IP Law

(57) ABSTRACT

A structural member includes an inflatable bladder. The structural member may include a fabric shell disposed about an exterior surface of the bladder, or a spacer element attached to an interior surface of the bladder. The fabric shell or spacer element restrains the shape of the bladder to contour the bladder into a desired shape and increase the load carrying capacity of the bladder.

20 Claims, 4 Drawing Sheets

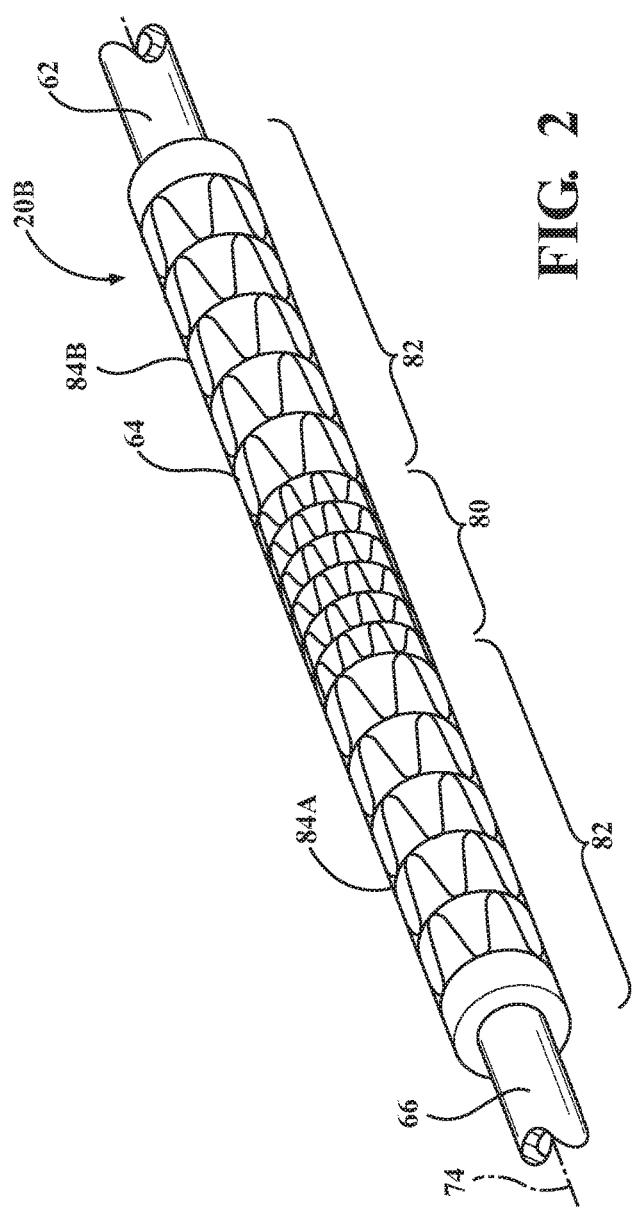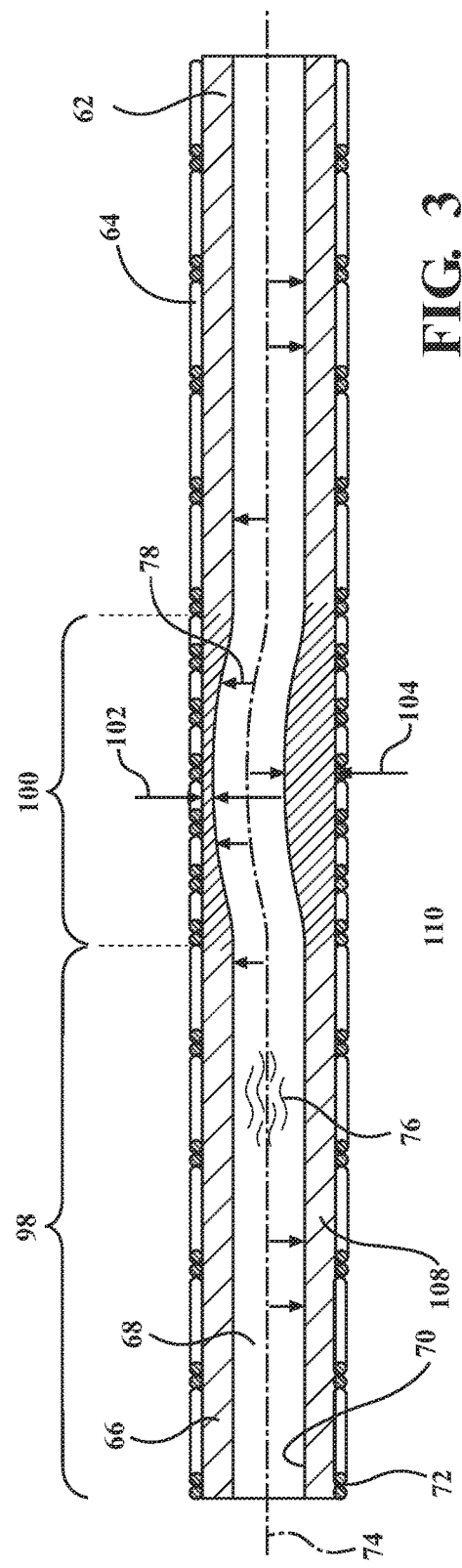

INFLATABLE STRUCTURAL MEMBER

INTRODUCTION

The disclosure generally relates to an inflatable structural member.

Structural members are used to carry or transmit loads. Inflatable structural members include an inflatable bladder as the primary load carrying member. The bladder is filled with a pressurized fluid that generates an outward pressure on the wall of the bladder, which may support a load. However, if the load is applied over a small area of the bladder, the bladder may deform under the load. In order to increase the load carrying capacity of the bladder, a fabric shell may be used to encapsulate the bladder. The fabric shell provides a resistance to expansion, so that the bladder may not deform as much under the load and/or may carry a larger load.

SUMMARY

A structural member is provided. The structural member includes a bladder and a spacer element. The bladder has a wall forming a pressure chamber. The wall includes an interior surface facing the pressure chamber, and an exterior surface disposed opposite the interior surface. The spacer element is disposed within the pressure chamber, and is attached to the interior surface of the wall of the bladder. The spacer element is operable to restrain expansion of the bladder in response to an internal fluid pressure within the pressure chamber that is greater than atmospheric pressure.

In one aspect of the disclosure, a fluid, such as but not limited to air, is disposed within the pressure chamber. The fluid exerts a fluid pressure onto the interior surface of the wall of the pressure chamber that is greater than atmospheric pressure.

In one aspect of the disclosure, the wall includes a first wall portion and a second wall portion. The first wall portion is disposed opposite the second wall portion, with the pressure chamber disposed between the first wall portion and the second wall portion. The spacer element includes a first layer attached to the first wall portion, and a second layer attached to the second wall portion. The spacer element further includes a spacer filament extending between and interconnecting the first layer and the second layer of the spacer element.

In one aspect of the disclosure, the wall of the bladder is flexible, such that outward expansion of the wall in response to the internal fluid pressure within the pressure chamber tensions the spacer filament to increase a load carrying capacity of the bladder.

In one aspect of the disclosure, the spacer element includes a first zone and a second zone. The first zone restrains the bladder to a first shape, and the second zone restrains the bladder to a second shape that is different from the first shape. In another aspect of the disclosure, the first zone provides a first restraining force against expansion of the wall, and the second zone provides a second restraining force against expansion of the wall, with the first restraining force different from the second restraining force.

In one aspect of the disclosure, the spacer element is a textile material including at least one of a woven structure or a knitted structure. In another aspect of the disclosure, the first zone differs from the second zone in one of a stitch type, a stitch pattern, a needle size, a yarn type, a yarn denier, a fiber type, a fiber size, a stitch density, a warp pattern, a weft pattern, or a weave type.

Another structural member is also provided. The structural member includes a bladder and a fabric shell. The bladder has a wall forming a pressure chamber. The wall includes an interior surface facing the pressure chamber, and an exterior surface disposed opposite the interior surface. The fabric shell is disposed adjacent to the exterior surface of the bladder. The fabric shell includes a first region and a second region. The first region of the fabric shell provides a first restraining force to the bladder in response to a pre-defined outward pressure force from the bladder. The second region of the fabric shell provides a second restraining force to the bladder in response to the pre-defined outward pressure force from the bladder. The wall of the bladder includes a motion control feature. The first restraining force and the second restraining force in combination with the motion control feature cause the fabric shell and the bladder to exhibit a pre-defined shape in response to the pre-defined outward pressure force from the bladder.

In one aspect of the disclosure, a fluid, such as but not limited to air, is disposed within the pressure chamber. The fluid exerts a fluid pressure on the wall of the bladder that is greater than atmospheric pressure for generating the pre-defined outward pressure force.

In one aspect of the disclosure, the fabric shell is a textile material including at least one of a woven structure or a knitted structure. In another aspect of the disclosure, the first region and the second region of the fabric shell differ in at least one of a stitch type, a stitch pattern, a needle size, a yarn type, a yarn denier, a fiber type, a fiber size, a stitch density, a warp pattern, a weft pattern, or a weave type.

In one aspect of the disclosure, the motion control feature includes one of a different thickness of the wall, a different fiber reinforcement density in the wall, or a defined helix angle of a reinforcing fiber helically wound around the wall of the bladder.

In one aspect of the disclosure, the motion control feature includes the wall having a first zone exhibiting a first physical characteristic, and a second zone exhibiting a second physical characteristic.

In one embodiment, the first physical characteristic of the first zone includes a first wall thickness providing a first bending strength, and the second physical characteristic of the second zone includes a second wall thickness providing a second bending strength. The first wall thickness and the first bending strength are different from the second wall thickness and the second bending strength.

In one embodiment of the disclosure, the wall includes a reinforcing fiber helically wound around the wall of the bladder. The reinforcing fiber defines a helix angle, with the helix angle in the first zone being different than the helix angle in the second zone.

In another embodiment of the disclosure, the wall of the bladder is a fiber reinforced material having a fiber density, with the fiber density in the first zone being different than the fiber density in the second zone.

Accordingly, the fabric of the structural member, either the spacer element or the fabric shell, restrains the bladder. Characteristics of the fabric may vary to control the shape of the bladder. Accordingly, by changing a stitch type, a stitch pattern, a needle size, yarn type, a yarn denier, a fiber type, a fiber size, a stitch density, a warp pattern, a weft pattern, or a weave type in the fabric, the fabric may contour the bladder to provide a desired shape, and increase the load carrying capacity of the structural member. In some embodiments, the wall of the bladder may include a motion control feature to further control the shape of the bladder in response to fluid pressure within the pressure chamber.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 2 is a schematic perspective view of a second embodiment of the structural member in a deflated state.

FIG. 3 is a schematic cross sectional view of the second embodiment of the structural member parallel with a longitudinal centerline and in the deflated state.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
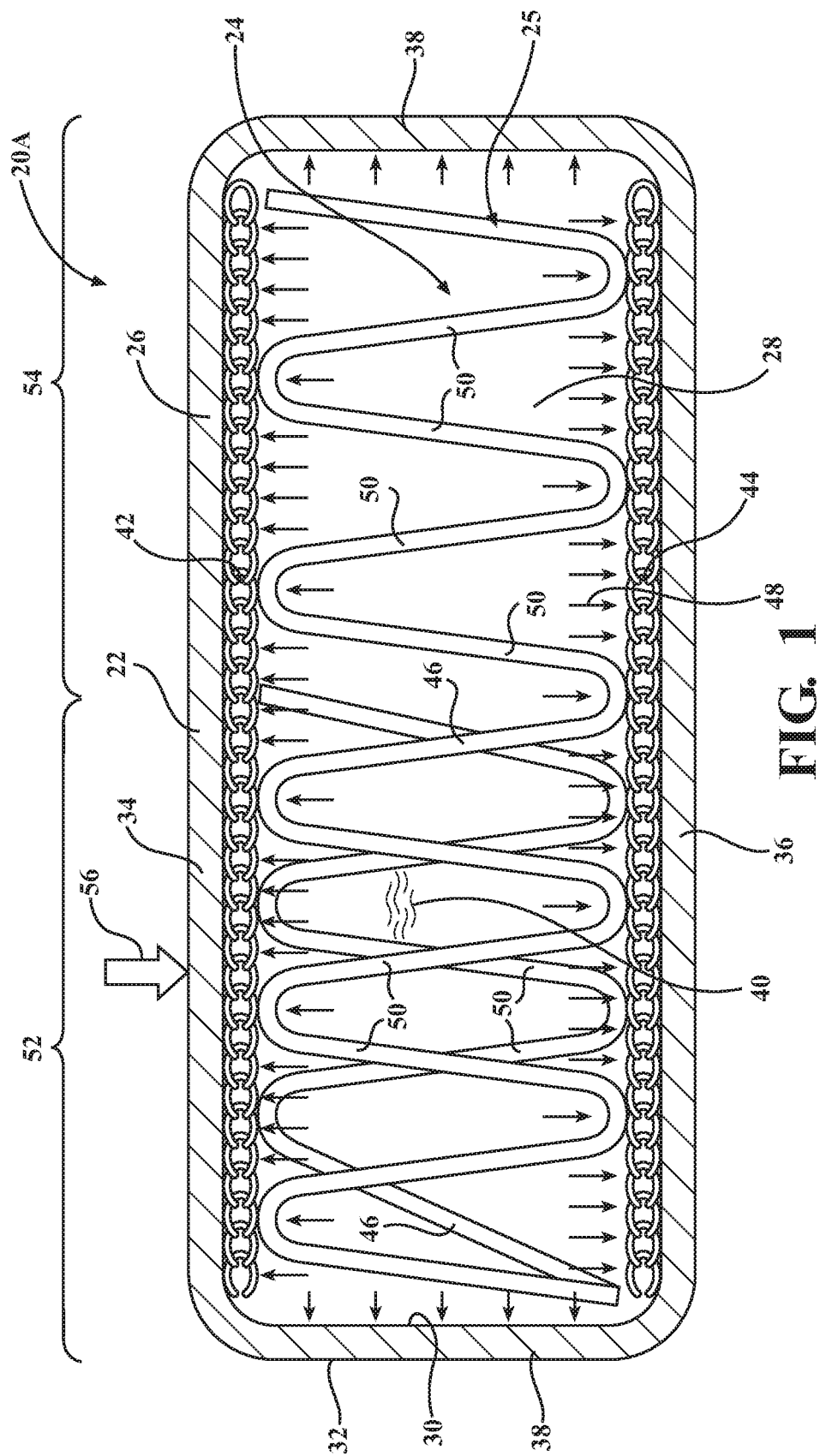
FIG. 1 is a schematic cross sectional view of a first embodiment of a structural member.

Referring to the FIGS., wherein like numerals indicate like parts throughout the several views, a first embodiment of a structural member is generally shown at 20A in FIG. 1. Referring to FIG. 1, the structural member 20A includes a bladder 22 and a spacer element 24. The bladder 22 includes a wall 26 forming a pressure chamber 28. The wall 26 includes an interior surface 30 facing the pressure chamber 28, and an opposing exterior surface 32. The wall 26 includes a first wall portion 34 and a second wall portion 36. The first wall portion 34 may be considered an upper wall portion as viewed on the page of FIG. 1, whereas the second wall portion 36 may be considered a lower wall portion as viewed on the page of FIG. 1. The bladder 22 may further include one or more side wall portions 38 as viewed on the page of FIG. 1. The side wall portions 38 extend between and connect the first wall portion 34 and the second wall portion 36 to form the closed pressure chamber 28. The first wall portion 34 and the second wall portion 36 are disposed opposite each other, with the pressure chamber 28 disposed between the first wall portion 34 and the second wall portion 36.

The wall 26 of the bladder 22 is manufactured from a flexible material. As used herein, the term "flexible material" is defined as a material capable of being bent and/or stretched without permanent deformation and without breaking. For example, the wall 26 of the bladder 22 may be manufactured from, but is not limited to, silicone, polyurethane, natural rubber (latex), other resilient air tight polymers, or metallic foils. The wall 26 of the bladder 22 may be formed to exhibit a desired shape, as described in greater detail below.

A fluid 40 is disposed within the pressure chamber 28, and is constrained by the wall 26 of the bladder 22. Accordingly, it should be appreciated that the pressure chamber 28 of the bladder 22 is fluid tight. The fluid 40 exhibits or exerts a fluid pressure against the wall 26 of the bladder 22 that is greater than atmospheric pressure. As such, the pressure chamber 28 is pressurized by the fluid 40 to cause the wall 26 of the bladder 22 to expand outward away from a center of the pressure chamber 28. The fluid 40 may include, but is not limited to, a gas, such as air or nitrogen. In other embodiments, the fluid 40 may include a liquid.

The spacer element 24 is disposed within the pressure chamber 28, and is attached to the interior surface 30 of the wall 26 of the bladder 22. The spacer element 24 is a textile material including at least one of a woven structure or a knitted structure. The term "textile material" as used herein, refers to a material which is formed by one or more of weaving, knitting, crocheting, braiding or a combination of these to form the textile material, and where weaving generates a woven structure in the textile material, knitting generates a knitted structure in the textile material, crocheting generates a crocheted structure in the material, and braiding generates a braided structure in the textile material. It would be appreciated that the textile material made using a combination of these methods could have portions of the textile material which incorporate multiple structures, for example, a knitted portion could be formed using braided fibers, fibers could be woven through a knitted or crocheted structure to provide dimensional strength and/or stabilization, a crocheted edge could be formed on a knitted or woven structure, woven layers could be knitted together to form a multi-layer textile material such as a 3D textile material, etc. The textile material can include one or more types of fiber, including one or more of an organic fiber such as an animal fiber, a plant-based fiber, a synthetic fiber such as a polymeric fiber, a carbon-based fiber, a ceramic-based fiber such as a glass-based fiber, a metal-based fiber including steel-based fiber and/or wire and aluminum-based fiber and/or wire, a blended fiber such as an animal/synthetic blended fiber, an animal/plant blended fiber, a plant/synthetic blended fiber, a glass/polymer blended fiber (fiberglass), a metal/synthetic blended fiber, etc., and/or a combination of two or more of the various fiber types. Animal fiber can include wool fiber produced from the hair and/or fur of an animal providing hair/fur suitable for fiber production, including by way of non-limiting example, sheep, goats, rabbits, llamas, etc., silk fiber produced from insect cocoons, and the like. Plant-based fiber can include fiber produced from a plant providing a plant material which is suitable for fiber production, including by way of non-limiting example, cotton, flax, wood (acetate, rayon), bamboo, jute, hemp, raffia, sisal, soy, etc. Synthetic fiber can include, by way of non-limiting example, fibers made of one or more of acrylic, kevlar, nylon, nomex, polyester, spandex, and the like. The fiber can be formed, by way of non-limiting example, by spinning, extrusion, drawing, and the like. The textile material can be formed of a yarn including a plurality of fibers which have been spun or twisted together or otherwise interlocked or joined to form a yarn. The textile material can include monofilament fiber, polyfilament fiber, staple fiber, or a combination of these.

The spacer element 24 may include, but is not limited to a spacer fabric 25. The exemplary embodiment shown in the FIGS. and described herein includes the spacer element embodied as the spacer fabric 25. However, it should be appreciated that the spacer element 24 may include some other textile material other than the exemplary spacer fabric described herein. For example, the spacer element 24 may alternatively include a tubular structure.

The spacer fabric 25 is a three dimensional knitted or woven fabric consisting of two separate substrates, i.e., a first layer 42 and a second layer 44, which are joined together but spaced apart by a spacer yarn, i.e., a spacer filament 46. The spacer fabric 25 includes the first layer 42, which is attached to the first wall portion 34, and the second layer 44, which is attached to the second wall portion 36. The spacer filament 46 extends between and interconnects the first layer 42 and the second layer 44 of the spacer fabric 25.

The first layer 42 may be attached to the first wall portion 34 in a suitable manner, such as but not limited to bonding the first layer 42 to the first wall portion 34 with an adhesive, or in some other manner that permanently attaches the first layer 42 and the first wall portion 34, and prevents separation of the first layer 42 from the first wall portion 34. Similarly, the second layer 44 may be attached to the second wall portion 36 in a suitable manner, such as but not limited to, bonding the second layer 44 to the second wall portion 36 with an adhesive, or in some other manner that permanently attaches the second layer 44 and the second wall portion 36, and prevents separation of the second layer 44 from the second wall portion 36. The spacer filament 46 is attached to both the first layer 42 and the second layer 44. The spacer filament 46 may include a single filament woven between the first layer 42 and the second layer 44, or multiple independent strands of filaments that each extend between and interconnect the first layer 42 and the second layer 44.

The first layer 42 and the second layer 44 may include and be manufactured from a suitable fiber(s), such as but not limited to a polymeric yarn, a polymeric monofilament, a metallic wire or cable, an elastic yarn or monofilament, an active material fiber, or combinations thereof. The spacer filament 46 may include and be manufactured from a suitable fiber(s), such as but not limited a polymeric yarn, a polymeric monofilament, a metallic wire or cable, an elastic yarn or monofilament, an active material fiber, or combinations thereof. Furthermore, as noted above, the first layer 42 and the second layer 44 may be woven or knitted fabrics.

The spacer fabric 25 is operable to restrain expansion of the bladder 22 in response to the internal fluid pressure 48 exerted by the fluid 40 within the pressure chamber 28. As noted above, the fluid 40 exerts the internal fluid pressure 48 on the wall 26 of the bladder 22 that is greater than atmospheric pressure. As the first wall portion 34 and the second wall portion 36 are spaced away from each other by the internal fluid pressure 48 exerted by the fluid 40 in the pressure chamber 28, the first layer 42 and the second layer 44 of the spacer fabric 25, being attached to the first wall portion 34 and the second wall portion 36 respectively, move away from each other. As the first layer 42 and the second layer 44 move away from each other, the spacer filament 46 that extends between and interconnects the first layer 42 and the second layer 44 is drawn taught and brought into a tensile or tensioned state. Once the spacer filament 46 is tensioned, the spacer filament 46 restrains further movement or expansion of the first wall portion 34 and the second wall portion 36 away from each other. As such, the spacer fabric 25 restrains outward expansion of the wall 26 in response to the internal fluid pressure 48 exerted by the fluid 40 within the pressure chamber 28.

The spacer filament 46 includes multiple segments 50 that extend between and interconnect the first layer 42 and the second layer 44. Accordingly, it should be appreciated that once the spacer filament 46 is tensioned, each of these multiple segments 50 is tensioned. Each of the tensioned segments 50 of the spacer filament 46 act as a pre-loaded column that may carry a load 56. The load carrying capacity of the structural member 20A is thereby greatly increased by the multiple segments 50 of the spacer filament 46. Furthermore, by incorporating the spacer fabric 25 into the pressure chamber 28 and pressurizing the pressure chamber 28 until the individual segments 50 of the spacer filament 46 are tensioned, the spacer filament 46 prevents the wall 26 from expanding in areas away from the load 56, thereby reducing deformation of the bladder 22 in response to the load 56.

The spacer fabric 25 and the bladder 22 may be formed to include and/or define a first zone 52 and a second zone 54. The first zone 52 and the second zone 54 may be defined as different areas or regions of the structural member 20A. The first zone 52 and the second zone 54 may be configured differently to provide different characteristics. For example, the first zone 52 of the spacer fabric 25 and the bladder 22 may be configured to provide a different shape and/or load carrying capacity than the second zone 54. While a first zone 52 and a second zone 54 are described herein, it should be appreciated that the structural member 20A may include a number of differently configured zones to provide the desired characteristics for the structural member 20A. For example, the first zone 52 may restrain the bladder 22 to a first shape, and the second zone 54 may restrain the bladder 22 to a second shape, with the second shape being different from the first shape. Alternatively, the first zone 52 may provide a first restraining force against expansion of the wall 26 to achieve a first load carrying capacity, and the second zone 54 may provide a second restraining force against expansion of the wall 26 to achieve a second load carrying capacity, with the first restraining force being different from the second restraining force.

The construction of the spacer fabric 25 may differ between the first zone 52 and the second zone 54 in a manner that provides the desired difference in characteristics between the first zone 52 and the second zone 54. For example, the first zone 52 may differ from the second zone 54 in one or more of a stitch type, a stitch pattern, a needle size, a yarn type, a yarn denier, a fiber type, a fiber size, a stitch density, a warp pattern, a weft pattern, or a weave type. It should be appreciated that the wall 26 of the bladder 22 may vary between the first zone 52 and the second zone 54 to further enhance the desired difference in characteristics between the first zone 52 and the second zone 54. For example, the first zone 52 and the second zone 54 of the wall 26 may be manufactured from different materials having different stiffness and/or flexibility.

Referring to FIGS. 2-6, a second embodiment of the structural member is generally shown at 20B. The structural member 20B includes a bladder 62, and a fabric shell 64. The bladder 62 includes a wall 66 forming a pressure chamber 68. The wall 66 includes an interior surface 70 facing the pressure chamber 68, and an opposing exterior surface 72. In the exemplary embodiment shown in the FIGS. and described herein, the wall 66 is formed to have a generally circular cross sectional shape extending along longitudinal centerline 74 to form a tubular structure. However, it should be appreciated that other embodiments of the structural member 20B may be configured to have a shape that differs from the exemplary embodiment shown and described herein.

The wall 66 of the bladder 62 is manufactured from a flexible material. As used herein, the term "flexible material" is defined as a material capable of being bent and/or stretched without permanent deformation and without breaking. For example, the wall 66 of the bladder 62 may be manufactured from, but is not limited to, silicone, polyurethane, natural rubber (latex), other resilient air tight polymers, or metallic foils.

Figure 6:
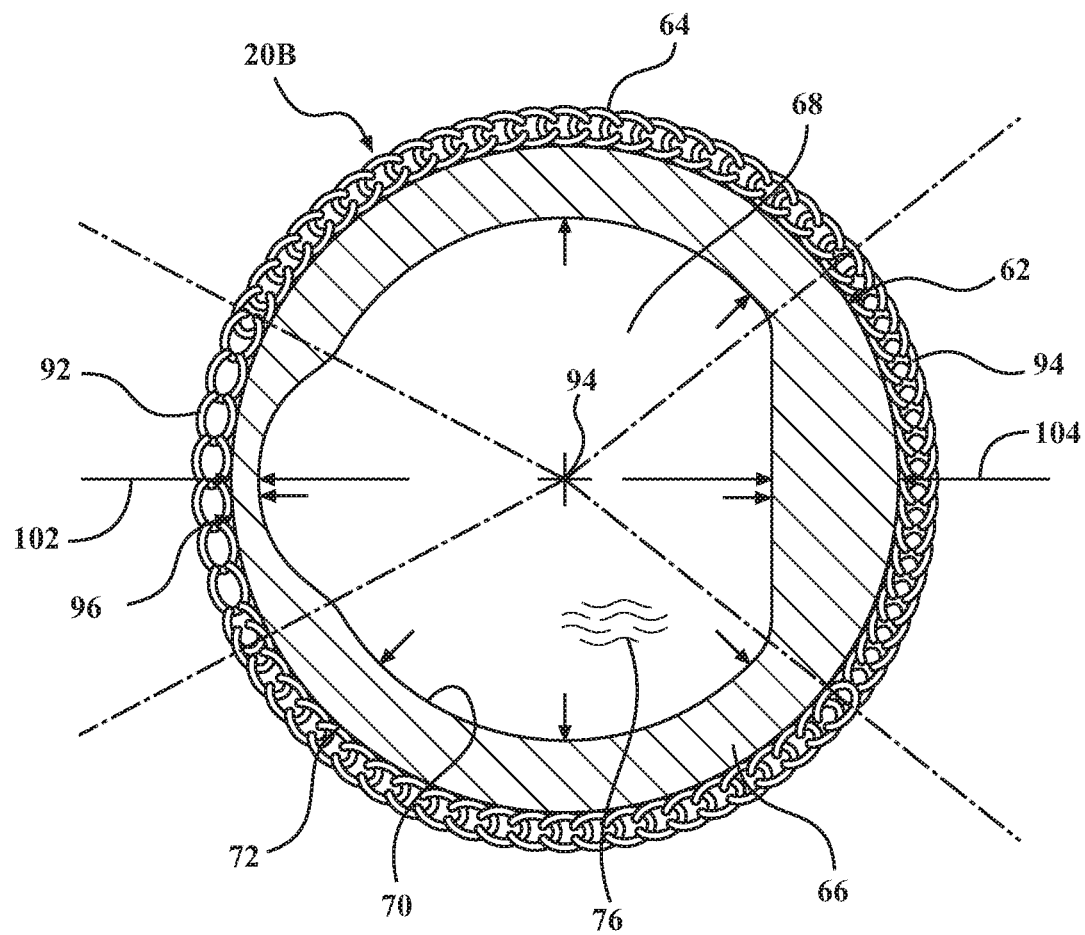
FIG. 6 is a schematic cross sectional view of the second embodiment of the structural member perpendicular to the longitudinal centerline.

As shown in FIG. 6, a fluid 76 is disposed within the pressure chamber 68, and is constrained by the wall 66 of the bladder 62. Accordingly, it should be appreciated that the pressure chamber 68 of the bladder 62 is fluid tight. The fluid 76 exhibits or exerts a fluid pressure against the wall 66 of the bladder 62 that is greater than atmospheric pressure. As such, the pressure chamber 68 is pressurized by the fluid 76 to cause the wall 66 of the bladder 62 to expand outward. The fluid 76 may include, but is not limited to, a gas, such as air or nitrogen. In other embodiments, the fluid 76 may include a liquid. The internal fluid pressure exerted by the fluid 76 within the pressure chamber 68 operates to generate a pre-defined outward pressure force 78 on the wall 66 of the bladder 62.

The fabric shell 64 is disposed adjacent to the exterior surface 72 of the bladder 62. The fabric shell 64 is wrapped around and generally encircles the bladder 62. The fabric shell 64 is a textile material including at least one of a woven structure or a knitted structure. The fabric shell 64 may include and be manufactured from a suitable fiber(s), such as but not limited to a polymeric yarn, a polymeric monofilament, a metallic wire or cable, an elastic yarn or monofilament, an active material fiber, or combinations thereof.

The fabric shell 64 includes a first region 80 and a second region 82. The second region 82 may alternatively be referred to herein as a central region 82. As shown in the exemplary embodiment, the first region 80 may include a first sub-region 84A and a second sub-region 84B disposed on opposite sides of the central region 82 along the longitudinal centerline 74 of the structural member 20B. In one embodiment, the first sub-region 84A and the second sub-region 84B are generally similar or identical in structure. In other embodiments the first sub-region 84A and the second sub-region 84B are configured differently from each other.

Figure 5:
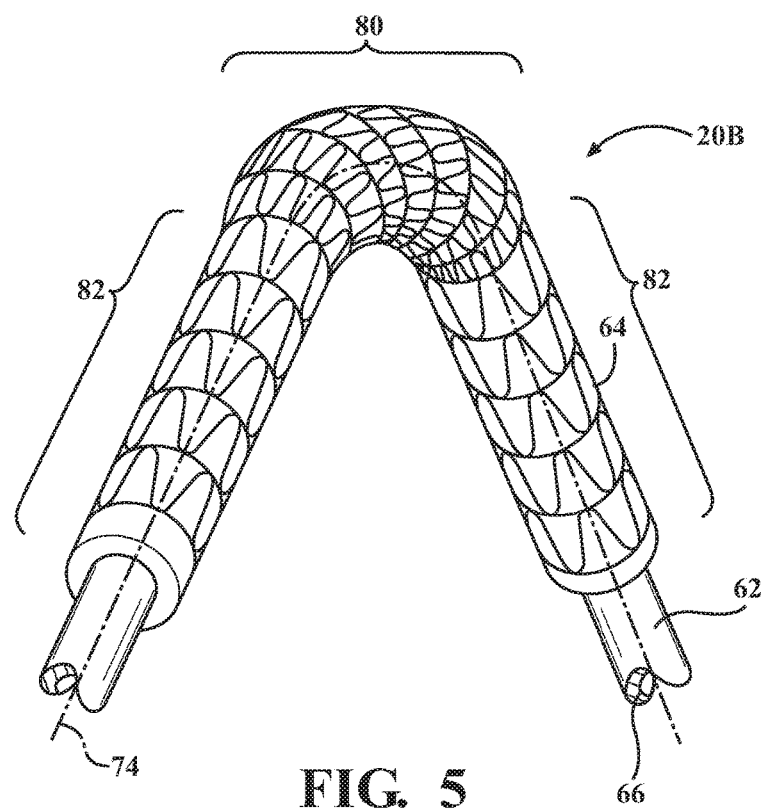
FIG. 5 is a schematic perspective view of the second embodiment of the structural member in an inflated state.

The first region 80 and the central region 82 of the fabric shell 64 differ from each other to cause the structural member 20B to exhibit a pre-defined shape, generally shown in FIG. 5. The first region 80 and the second region 82 of the fabric shell 64 may differ from each other in at least one of a stitch type, a stitch pattern, a needle size, a yarn type, a yarn denier, a fiber type, a fiber size, a stitch density, a warp pattern, a weft pattern, or a weave type.

The first region 80 of the fabric shell 64 provides a first restraining force to the bladder 62 in response to the pre-defined outward pressure force 78 exerted on the bladder 62 by the fluid 76 disposed within the pressure chamber 68. It should be appreciated that the first sub-region 84A and the second sub-region 84B of the first region 80 may both be configured to provide the first restraining force along their respective axial sections of the structural member 20B. The central region 82 of the fabric shell 64 provides a second restraining force to the bladder 62 in response to the pre-defined outward pressure force 78 exerted by the fluid 76 disposed in the pressure chamber 68.

As best shown in FIG. 6, the central region 82 may be configured so that a first radial segment 92 of the central region 82 provides a different restraining force from a second radial segment 94 of the central region 82. As such, the second restraining force provided by the central region 82, may be stronger or greater on one side of the structural member 20B than on another. In other words, the second restraining force may not be evenly distributed in a radial direction around the longitudinal centerline 74, but may be greater in one radial direction than another. Having the second restraining force be greater in one radial direction than in an opposing radial direction, when restrained by the first restraining force from the first region 80, causes the bladder 62 to form a curve or bend in the central region 82.

The wall 66 of the bladder 62 includes a motion control feature 96. The motion control feature 96 is operable to cause the wall 66 of the bladder 62 to form into the pre-defined shape. Accordingly, the difference between the first restraining force and the second restraining force provided by the first region 80 and the central region 82 of the fabric shell 64, in combination with the motion control feature 96 of the wall 66, cause the fabric shell 64 and the bladder 62 to exhibit the pre-defined shape, generally shown in FIG. 5, in response to the pre-defined outward pressure force 78 exerted on the bladder 62 from the fluid 76 within the pressure chamber 68. The structural member 20B described herein may be combined with multiple similarly configured structural members 20B to form panels or other structures that exhibit complex three dimensional shapes.

The motion control feature 96 may include a structural feature or physical characteristic of the wall 66 that is capable of biasing the wall 66 into the pre-defined shape. For example, the motion control feature 96 may include the wall 66 having a first zone 98 exhibiting a first physical characteristic, and a second zone 100 exhibiting a second physical characteristic. The characteristic of the wall 66 forming the motion control feature 96 may include, but is not limited to, a thickness of the wall 66, a density or lay-up pattern of fiber reinforcement strands in the wall 66, or an orientation of a reinforcing fiber 106 in the wall 66.

In one exemplary embodiment, referring to FIGS. 3 and 6, the first physical characteristic of the first zone 98 includes a first wall thickness 102 providing a first bending strength, and the second physical characteristic of the second zone 100 includes a second wall thickness 104 providing a second bending strength. The first wall thickness 102 and the first bending strength are different than the second wall thickness 104 and the second bending strength. As shown in FIG. 3, the first zone 98 has a thinner wall thickness than the second zone 100. As such, the first zone 98 will have a lower bending strength. This difference between the physical characteristics of the first zone 98 and the second zone 100 tends to make the second zone 100, i.e., the thicker section of the wall 66, form an outside or larger radius when bending, whereas the smaller wall thickness of the first zone 98 will tend to form an inside or smaller radius when bending.

Figure 4:
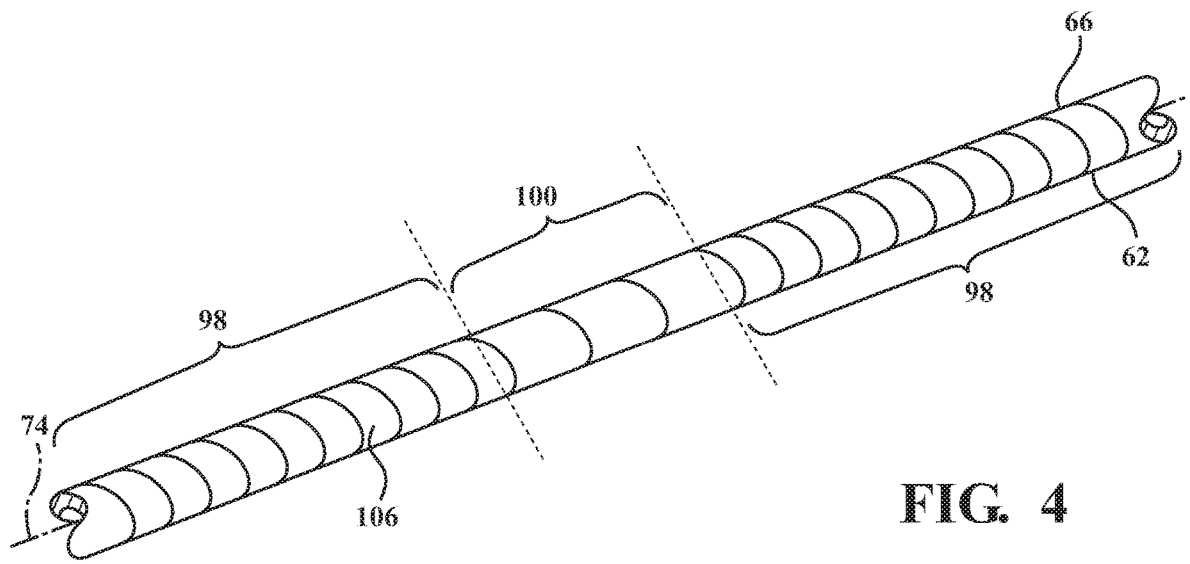
FIG. 4 is a schematic perspective view of a bladder of the second embodiment of the structural member in the deflated state.

In another exemplary embodiment, referring to FIG. 4, the wall 66 includes the reinforcing fiber 106 that is helically wound around the wall 66 of the bladder 62. The helically wound reinforcing fiber 106 forms or defines a helix angle. The helix angle in the first zone 98 is different than the helix angle in the second zone 100. A smaller helix angle, e.g., less than fifty-seven degrees (57°), tends to cause the bladder 62 to expand radially and contract or shorten along the longitudinal centerline 74, until the helix angle is approximately equal to fifty-seven degrees. In contrast, a larger helix angle, e.g., greater than fifty-seven degrees, tends to cause the bladder 62 to contract radially and expand or length along the longitudinal centerline 74, until the helix angle is approximately equal to fifty-seven degrees.

In another embodiment, the wall 66 of the bladder 62 may include and be manufactured from a fiber reinforced material. The fiber reinforced material includes fibers. The fibers define a fiber density, i.e., a volume or number of fibers per unit length along the longitudinal centerline 74. The fiber density may be varied to change the bending strength of the wall 66. Furthermore, the fibers may be positioned in specific patterns, referred to as a lay-up pattern, in order to provide or change the bending strength of the wall 66.

The first physical characteristic of the first zone 98 may include a first fiber density 108 and/or fiber lay-up pattern providing a first bending strength, and the second physical characteristic of the second zone 100 may include a second fiber density 110 and/or lay-up pattern providing a second bending strength. The first fiber density 108 and/or fiber lay-up pattern is different from the second fiber density 110 and/or fiber lay-up pattern. As shown in FIG. 3, the first zone 98 has a lesser fiber density 108 than the fiber density 110 of the second zone 100. As such, the first zone 98 will have a lower bending strength. This difference between the physical characteristics of the first zone 98 and the second zone 100 tends to make the second zone 100, i.e., the higher fiber density section of the wall 66, form an outside or larger radius when bending, whereas the lesser fiber density in the first zone 98 will tend to form an inside or smaller radius when bending.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A structural member comprising:
   a bladder having a wall defining a pressure chamber, wherein the wall includes an interior surface facing the pressure chamber;
   a spacer element disposed inside the pressure chamber and attached to the interior surface of the wall; and
   wherein the spacer element is operable to restrain expansion of the bladder in response to an internal fluid pressure within the pressure chamber that is greater than atmospheric pressure.

2. The structural member set forth in claim 1, further comprising a fluid disposed within the pressure chamber and exhibiting a fluid pressure greater than atmospheric pressure.

3. The structural member set forth in claim 1, wherein the wall includes a first wall portion and a second wall portion, with the first wall portion disposed opposite the second wall portion, and with the pressure chamber disposed between the first wall portion and the second wall portion.

4. The structural member set forth in claim 3, wherein the spacer element includes a first layer attached to the first wall portion, and a second layer attached to the second wall portion.

5. The structural member set forth in claim 4, wherein the spacer element includes a spacer filament extending between and interconnecting the first layer and the second layer of the spacer element.

6. The structural member set forth in claim 5, wherein the wall of the bladder is flexible, such that outward expansion of the wall in response to the internal fluid pressure within the pressure chamber tensions the spacer filament to increase a load carrying capacity of the bladder.

7. The structural member set forth in claim 5, wherein the spacer element includes a first zone and a second zone, wherein the first zone restrains the bladder to a first shape, and the second zone restrains the bladder to a second shape that is different from the first shape.

8. The structural member set forth in claim 7, wherein the first zone provides a first restraining force against expansion of the wall, and the second zone provides a second restraining force against expansion of the wall, with the first restraining force different from the second restraining force.

9. The structural member set forth in claim 7, wherein the spacer element is a textile material including at least one of a woven structure or a knitted structure.

10. The structural member set forth in claim 9, wherein the first zone differs from the second zone in one of a stitch type, a stitch pattern, a needle size, a yarn type, a yarn denier, a fiber type, a fiber size, a stitch density, a warp pattern, a weft pattern, or a weave type.

11. The structural member set forth in claim 1, wherein the spacer element is a spacer fabric.

12. A structural member comprising:
    a bladder having a wall forming a pressure chamber, wherein the wall includes an interior surface facing the pressure chamber, and an exterior surface disposed opposite the interior surface;
    a fabric shell disposed adjacent to the exterior surface of the bladder, and having a first region and a second region;
    wherein the first region of the fabric shell provides a first restraining force to the bladder in response to a pre-defined outward pressure force from the bladder, and the second region of the fabric shell provides a second restraining force to the bladder in response to the pre-defined outward pressure force from the bladder; and
    wherein the wall of the bladder includes a motion control feature, such that the first restraining force and the second restraining force in combination with the motion control feature cause the fabric shell and the bladder to exhibit a pre-defined shape in response to the pre-defined outward pressure force from the bladder.

13. The structural member set forth in claim 12, further comprising a fluid disposed within the pressure chamber and exhibiting a fluid pressure on the wall of the bladder that is greater than atmospheric pressure for generating the pre-defined outward pressure force.

14. The structural member set forth in claim 12, wherein the fabric shell is a textile material including at least one of a woven structure or a knitted structure.

15. The structural member set forth in claim 14, wherein the first region and the second region of the fabric shell differ in at least one of a stitch type, a stitch pattern, a needle size, a yarn type, a yarn denier, a fiber type, a fiber size, a stitch density, a warp pattern, a weft pattern, or a weave type.

16. The structural member set forth in claim 12, wherein the motion control feature includes one of a different thickness of the wall, a different fiber reinforcement density in the wall, or a defined helix angle of a reinforcing fiber helically wound around the wall of the bladder.

17. The structural member set forth in claim 12, wherein the motion control feature includes the wall having a first zone exhibiting a first physical characteristic, and a second zone exhibiting a second physical characteristic.

18. The structural member set forth in claim 17, wherein the first physical characteristic of the first zone includes a first wall thickness providing a first bending strength, and the second physical characteristic of the second zone includes a second wall thickness providing a second bending strength, with the first wall thickness and the first bending strength are different than the second wall thickness and the second bending strength.

19. The structural member set forth in claim 17, further comprising a reinforcing fiber helically wound around the wall of the bladder and defining a helix angle in the first zone and in the second zone, wherein the helix angle in the first zone is different than the helix angle in the second zone.

20. The structural member set forth in claim 17, wherein the wall of the bladder is a fiber reinforced material having a fiber density in the first zone and in the second zone, and wherein the fiber density in the first zone is different than the fiber density in the second zone.

\* \* \* \* \*